Feb. 26, 1929.                                1,703,525
E. G. HALLQUIST
SPRING EQUALIZING ARRANGMENT
Filed Oct. 13, 1927    4 Sheets-Sheet 1

INVENTOR
Einar G. Hallquist
By Cornwall, Bedell, Janney
ATTORNEYS

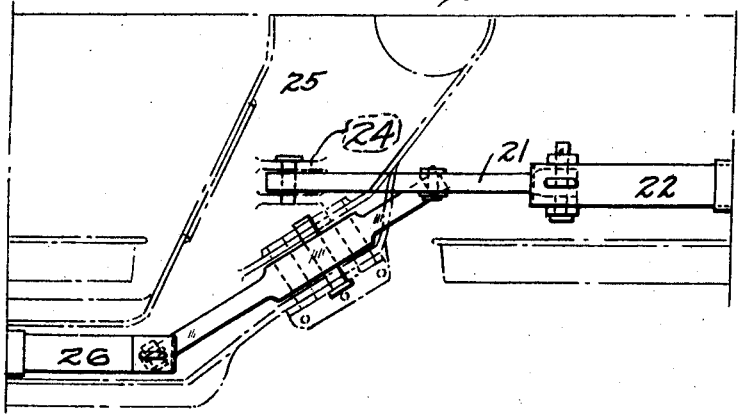
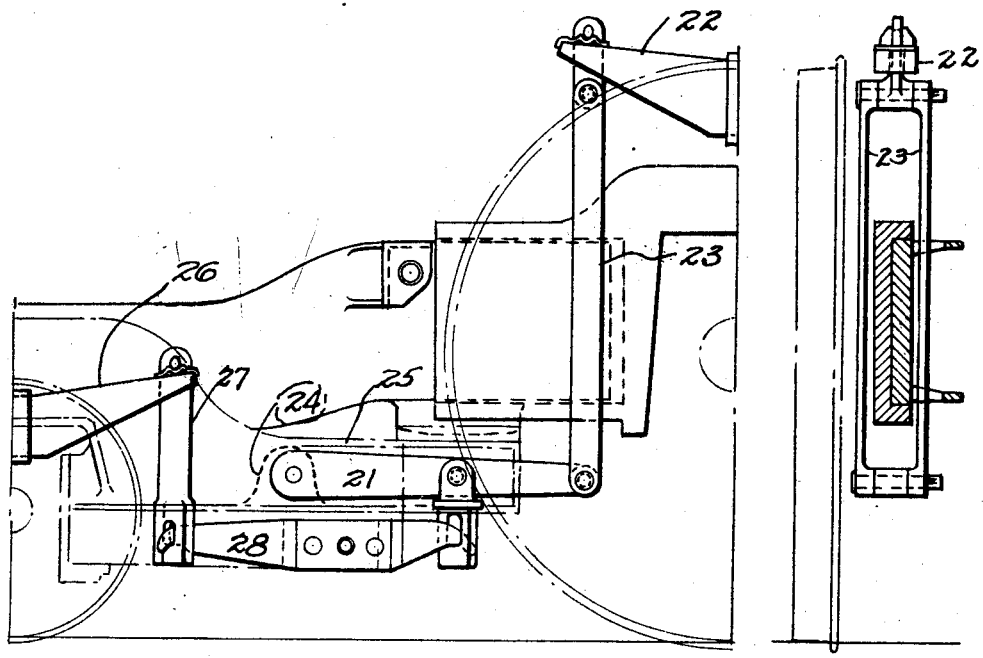

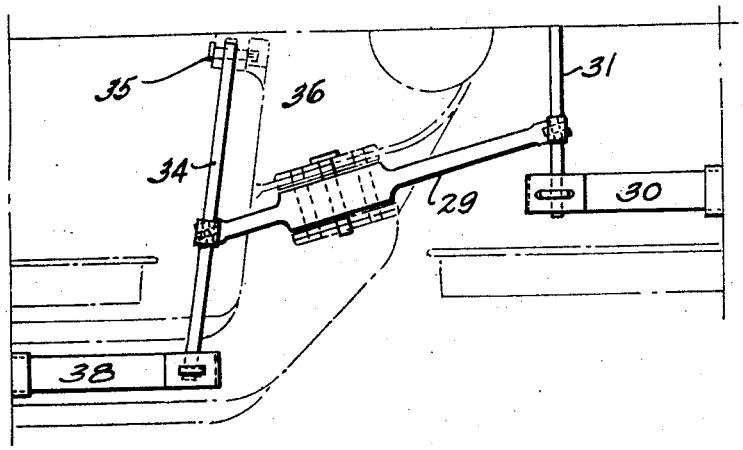
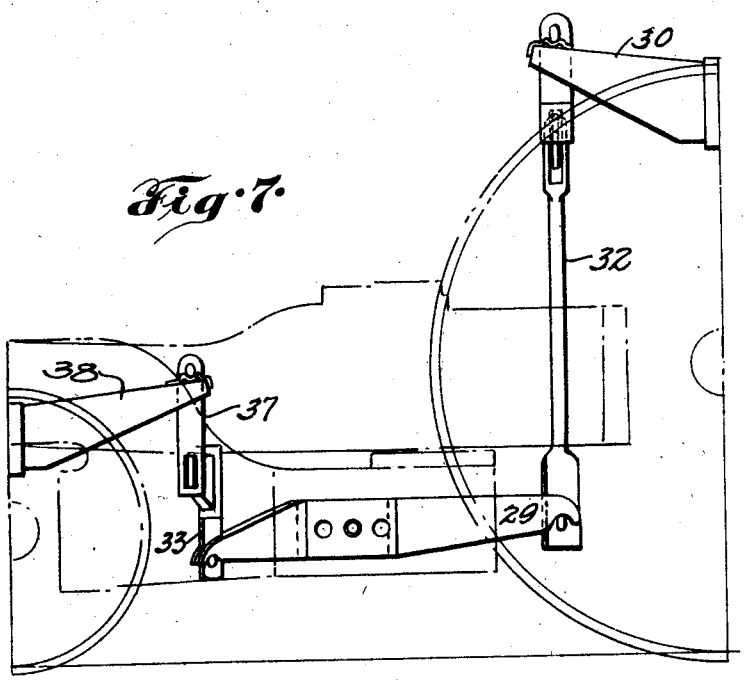
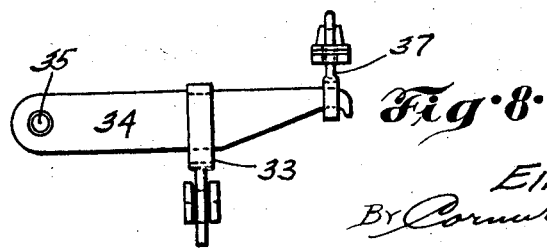

Feb. 26, 1929.                    E. G. HALLQUIST                    1,703,525
                            SPRING EQUALIZING ARRANGMENT
                               Filed Oct. 13, 1927          4 Sheets-Sheet 4

INVENTOR
Einar G. Hallquist
By Cornwall, Bedell & Janus
ATTORNEYS

Patented Feb. 26, 1929.

1,703,525

UNITED STATES PATENT OFFICE.

EINAR G. HALLQUIST, OF EDWARDSVILLE, ILLINOIS, ASSIGNOR TO COMMONWEALTH STEEL COMPANY, OF GRANITE CITY, ILLINOIS, A CORPORATION OF NEW JERSEY.

SPRING-EQUALIZING ARRANGEMENT.

Application filed October 13, 1927. Serial No. 225,895.

This invention relates to railway rolling stock and consists in a novel spring equalizing arrangement for connecting two spring systems, such as are used for supporting vehicle structure from two sets of wheels. A familiar example of such a spring system is that used for supporting the main frame and the trailer truck frame of a locomotive but it is to be understood that other combinations of spring systems may embody my invention whether or not locomotive main frame and trailer truck frames and their springs are involved or whether or not separate frames are utilized.

On present locomotive and trailer truck structures, it is customary for the driver journal boxes and the springs carried thereon to be located inside of the driver wheels. In order to accommodate the firebox ashpan, it is customary for the adjacent trailer journal axle boxes and springs carried thereon to be located outside of the trailer wheels. It is also customary to provide a truck frame separate from the main frame and located below a rearward extension of the main frame, which carries the firebox, cab structure, etc., and it is customary to connect the inside springs, directly supporting the main frame, to the outside springs, supporting the truck frame, through diagonal equalizers fulcrumed on one of the frames and extending beneath the ends of the adjacent springs and suspended directly therefrom. The closer the distance between the respective driver and truck wheels, or the distance between the contiguous ends of springs mounted on the driver and truck journals, the more likelihood there is of interference between the equalizer bar and one or both of the adjacent wheels or brake gear applied to the wheels.

The object of my invention is to eliminate the possibility of such interference by providing a structure which makes possible the use of an equalizer connecting inside and outside springs without unduly limiting the close assembly of the corresponding wheels and springs or brake gear applied thereto.

In the accompanying drawings which illustrate my invention—

Figures 3 and 4 are detail top view and side elevation, largely diagrammatic, of adjacent driver and truck wheels illustrating a modified embodiment of my invention.

Figure 5 is an end view of the driver spring and hanger arrangement.

Figures 6, 7 and 8 correspond to Figures 3, 4 and 5, but illustrate another modification of my invention.

Figure 9:
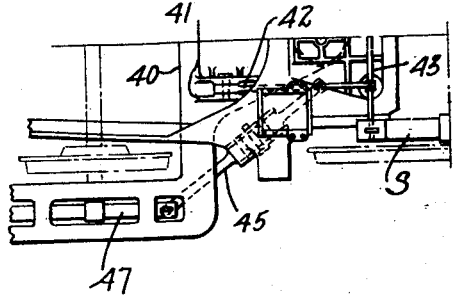
Figure 10:
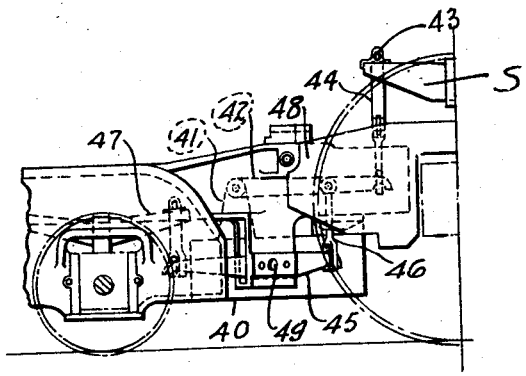

Figures 9 and 10 are, respectively, top and side views of another modification of my invention.

Figure 11:
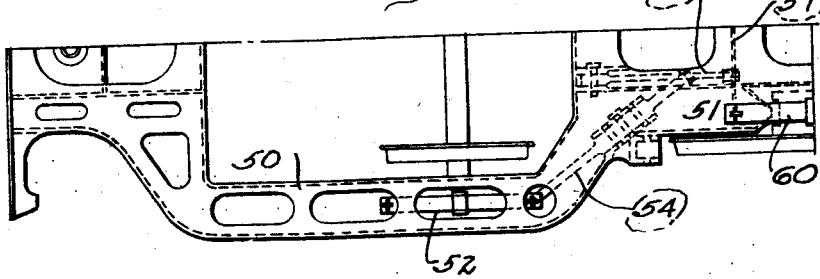
Figure 12:
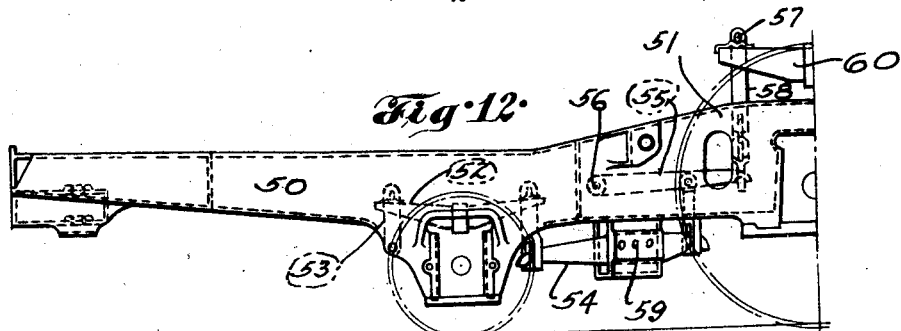

Figures 11 and 12 are, respectively, top and side views of another modification of my invention.

Figure 1:
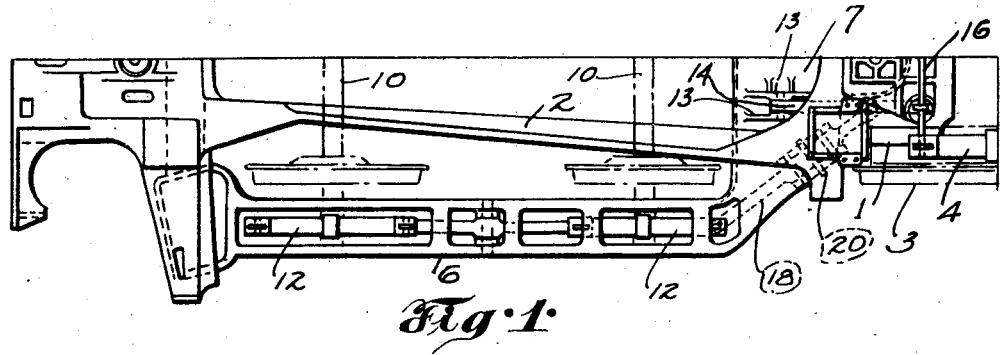
Figure 1 is a top view of the longitudinal half of the rear portion of a locomotive main frame showing the rear driver and a four wheel trailer truck supporting the main frame.
Figure 2:
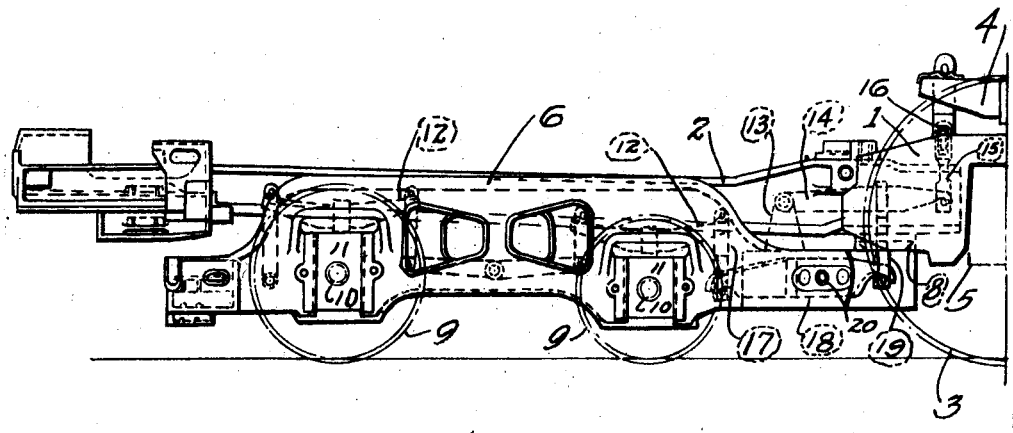
Figure 2 is a side elevation of the same.

In the construction shown in Figures 1 and 2, the main frame is indicated at 1, and is provided with a rearward extension or cradle 2 which may be formed integrally with the main frame or may be separately formed and secured thereto. It will be understood that the cab, fire box, and ash pan (not shown) are carried by the cradle 2. The rear driver is indicated at 3 and the rear driver spring is shown at 4. It will be understood that this spring is mounted on the driver box 5 and in the usual manner, and is interconnected to the springs mounted on the forward drivers.

A four wheel trailer truck frame is shown as provided with outside wheel pieces 6 and terminating at its front end in the transverse member 7 which is interconnected at 8 to the main frame in a well known manner, whereby the trailer truck is articulated in the main frame. The trailer truck wheels 9 are mounted upon axles 10 which carry outside journal boxes 11, which support the interconnected truck springs 12 in a well known manner.

On each side of the center line of the locomotive, the transverse member 7 of the truck frame is provided with an upstanding bracket 13 which forms a fulcrum for one end of a lever 14, the other end of which is supported by hanger 15 from a cross bar 16 carried by the rear ends of driver springs 4. The forward end of each front truck spring 12 is provided with a hanger 17 which carries the rear end of an equalizer 18, the opposite end of which is suspended from lever 14 by a hanger 19. Equalizer 18 is fulcrumed at 20 to the forward portion of the truck frame and supports the latter from springs 4 and 12.

It will be seen that this arrangement enables the front end of the equalizer 18 to be located at a point spaced from the end of spring 4, whereby any desired clearance may be provided between the equalizer and driver brake rigging without necessitating moving the truck frame rearwardly of the drivers. At the same time the stability of the truck frame is maintained because the other end of equalizer 18 is supported outside of the truck wheels rather than inside of the truck wheels, as is necessary where a cross equalizer between the truck springs is used.

In the arrangement shown in Figures 3 to 5, further stability is provided by supporting the front end of lever 21 directly from the rear driver spring 22, by means of a hanger 23, and the elimination of a cross bar between the driver springs. In this arrangement the rear portion of lever 21 is fulcrumed on brackets 24 provided within the box-shaped transverse member 25 of the truck frame, and this lever 21 is located at a substantially lower level than the lever shown in Figures 1 and 2. The arrangement of the truck spring 26, its hanger 27, and equalizer 28 is substantially the same as that shown in Figures 1 and 2.

In the construction shown in Figures 6, 7 and 8, I illustrate a modified structure which may be used where it is essential that the equalizer 29 be located within the wheels. In this construction, the driver springs 30 are connected by a cross bar 31 similar to the arrangement shown in Figures 1 and 2, and the front end of the equalizer 29 is suspended from this cross bar by a hanger 32. The rear end of equalizer 29 is supported by a link 33 from a cross lever 34 pivoted at 35 on the transverse member 36 of the frame and supported at its other end by a link 37 carried by the truck spring 38.

In Figures 9 and 10 I illustrate another modification in which the truck frame cross member 40 is provided with brackets 41 for supporting one end of a lever 42, the other end of which is supported by a hanger 44 from a cross bar 43 carried by the driver springs 8. An equalizer 45 is suspended from lever 42 by a link 46, and, at its opposite end, is suspended from the truck spring 47. So far this construction resembles those previously described, but it will be noted that the equalizer 45 supports the main frame 48 being fulcrumed on the latter at 49.

In the modification illustrated in Figures 11 and 12 I illustrate a structure in which the radial truck frame is eliminated and the trailer wheels and axle are journaled in the cradle 50 which forms a rearward extension of the main frame 51. The truck spring 52 supports the structure through a link 53, anchored to the cradle, and through the equalizer 54 which is fulcrumed on the frame at 59 and is suspended from the other end of spring 52 and from a lever 55 pivoted on the frame at 56 and suspended at its opposite end by a link 58 from the cross bar 57 carried by the driver springs 60.

In my copending application Serial No. 226,890, filed of even date herewith, I describe and claim a novel equalizing arrangement in which the equalizer supporting lever is fulcrumed on the main frame of the locomotive independently of the truck frame.

It will be understood that my invention is not limited to use in connecting the spring systems of a locomotive main frame and truck, but may be used in other systems in equalizing any two sets of spring systems whether used on a locomotive or elsewhere.

Obviously many variations in the details of my invention, other than those shown, may be made without departing from the spirit of my invention, and I contemplate the exclusive use of all such modifications as come within the scope of my claims.

I claim:

1. In a locomotive, a main frame, a supporting spring therefor, a lever partly supported from said spring and extending longitudinally of the locomotive beyond the end of said spring, a truck frame, a supporting spring therefor, and a truck frame supporting equalizer carried by said truck spring and said lever at a point on the latter between its fulcrum and its support.

2. In a locomotive, a main frame, a supporting spring therefor, a truck frame, a supporting spring therefor, an equalizer supporting said truck frame through a pivotal connection and having one end carried by said truck spring and extending from said spring towards the longitudinal center line of the locomotive, and means for carrying the other end of said equalizer from said main frame spring at a point beyond the end of the latter longitudinally of the truck.

3. In a locomotive, a main frame, a supporting spring therefor, a truck frame, a supporting spring therefor, a lever supported at its respective ends from one of said frames and from the spring supporting the other of said frames, and an equalizer supported at its respective ends from the other of said springs and from said lever.

4. In a locomotive, a main frame, a supporting spring therefor, a truck frame, a supporting spring therefor, a lever pivoted at one end on said truck frame and supported at its other end by one of said springs, and a truck frame supporting equalizer carried by said lever intermediate the ends of the latter and by the other of said springs.

5. In a locomotive, a main frame, a supporting spring therefor, a truck frame, a supporting spring therefor, a lever pivoted at one end on said truck frame and supported a its other end by said main frame spring, and a truck supporting equalizer carried by said lever and by said truck spring.

6. In a locomotive, a main frame, a truck frame, a main frame supporting spring, a truck frame supporting spring, an equalizer partly carried by and extending diagonally inwardly from said truck spring, and a lever pivoted on said truck frame in the rear of said main frame spring and supported at its other end by said main frame spring and carrying the inner portion of said equalizer.

7. In a locomotive, a main frame, a spring supporting said frame, a truck frame, a spring supporting said truck frame, a bracket on said truck frame beyond the end of said main frame spring, a lever fulcrumed on said bracket and supported by said main frame spring, and an equalizer, said truck spring and said lever having upwardly directed supporting elements for said equalizer, said equalizer being fulcrumed on said truck frame to support the latter.

8. In a locomotive, driving wheels, a main frame and supporting springs therefor located inwardly of said wheels, truck wheels, a truck frame and supporting springs therefor located outwardly of said truck wheels, members supported by said main springs and by truck frame elements at the rear of said main frame springs, and equalizers supporting said truck frame between their respective ends, said equalizers each having one end supported by one of said truck springs and having its other end supported by one of said members.

9. In a locomotive, a main frame, supporting springs therefor, a transverse member carried by said springs, a truck frame, a supporting spring therefor, a lever supported by said member and by said truck frame, and a truck frame supporting equalizer carried by said truck spring and by said member.

10. In a locomotive, a main frame, a truck frame, respective springs for supporting said frames, a compound connection between said springs comprising a lever, upwardly directed supporting elements therefor on one of said springs and on the frame supported by the other spring, and an equalizer supporting said latter mentioned frame, and upwardly directed supported elements on the spring for said latter mentioned frame and on said lever.

11. In a locomotive, a main frame, springs supporting the same, a truck frame having outside wheel pieces and a wheel piece connecting member in engagement with said main frame, truck frame supporting springs, brackets on said member spaced from said wheel pieces, levers each fulcrumed at one end on one of said brackets, and supported from one of said main frame springs at its opposite end, and equalizers each fulcrumed between its ends on said member and supported at its ends from one of said truck frame springs and from one of said levers.

12. In a locomotive truck frame, wheel pieces, a wheel piece connecting member, a fulcrum for a truck frame supporting an equalizer on the lower portion of said member, and a fulcrum for an equalizer supporting lever on the upper portion of said member.

13. In a railway vehicle, wheels and journals spaced longitudinally of the vehicle, a spring carried by one journal inwardly of its respective wheel, a spring carried by the other journal outwardly of its respective wheel, a vehicle frame member, a lever supported by said frame and by one of said springs, and a frame supporting equalizer carried by the other of said springs and by said lever between its fulcrum and its support.

14. In a railway vehicle, wheels and journals spaced longitudinally of the vehicle, a spring carried by one journal inwardly of its respective wheel, a spring carried by the other journal outwardly of its respective wheel, a vehicle frame member, a lever supported by said frame and by one of said springs, and an equalizer bar supported at its respective ends by one of said springs and by said lever between its fulcrum and its support, respectively, and between its ends supporting a portion of the vehicle frame.

15. In a locomotive truck frame, wheel pieces, a wheel piece connecting member, a fulcrum on said member for a truck frame supporting equalizer, and a fulcrum on said member for an equalizer supporting lever, said supporting lever fulcrum being located closer to the longitudinal center line of the frame than said equalizer fulcrum.

16. In a locomotive, a main frame, a truck frame, respective springs for supporting said frames, and a compound connection between said springs comprising a lever carried by one spring and by the frame supported by the other spring, and an equalizer carried by said latter-mentioned spring and by said lever and supporting one of said frames.

In testimony whereof I hereunto affix my signature this 5th day of Oct., 1927.

EINAR G. HALLQUIST.